May 29, 1956 M. H. FRANKLIN 2,747,912
KITCHEN TONGS
Filed Nov. 17, 1952
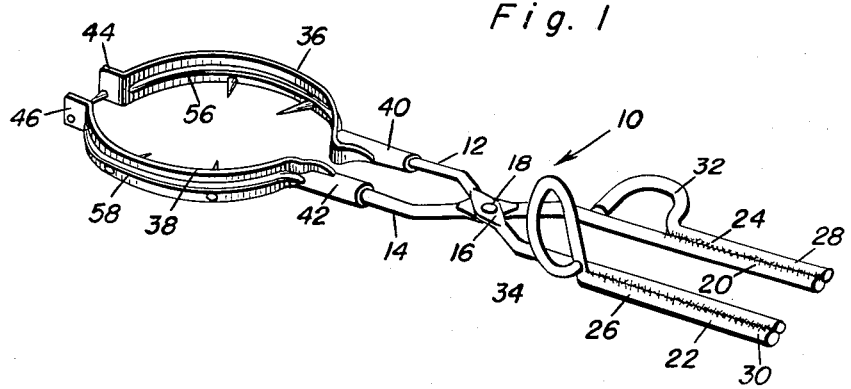
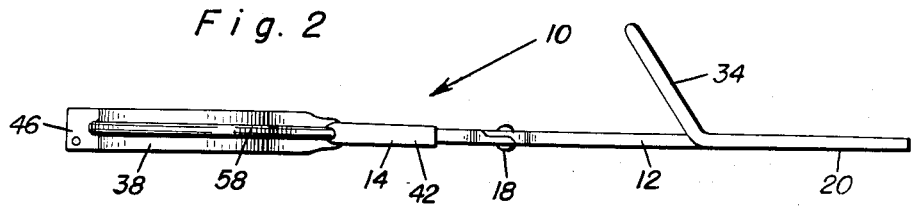
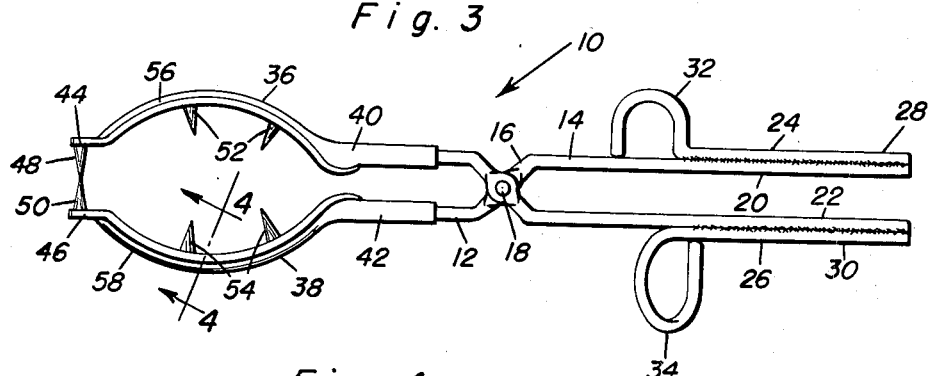
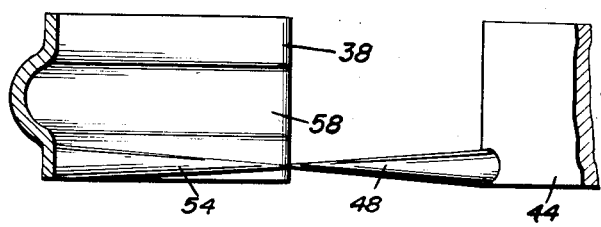
Murry H. Franklin
INVENTOR.
BY *Thomas A. O'Brien*
*and Harvey B. Jacobson*
Attorneys

United States Patent Office 2,747,912
Patented May 29, 1956

2,747,912
KITCHEN TONGS

Murry H. Franklin, Bastrop, La.

Application November 17, 1952, Serial No. 320,908

2 Claims. (Cl. 294—29)

This invention relates to a kitchen utensil and more particularly to tongs for use in handling foods.

The principal object of this invention resides in the provision of kitchen tongs which may be used to handle hot meats and vegetables without endangering the hands of the user by burns from steam, hot gases, and grease while cooking, serving and preparing foods.

Another object of the invention is to provide means for insuring the user an optimum amount of leverage by providing means for the tongs to be firmly grasped by the hands and fingers of the user.

One of the most important features of the invention is the inwardly extending spikes which are all secured to one side of the center lines of the holding portions of the tongs so as to readily penetrate meats, vegetables, and the like while not crumbling or tearing such foods. Further, by offsetting the spikes, it is possible to raise a glass of hot food by using that portion of the utensil not having spikes to grasp the upper edge of the glass.

Still further objects of the invention reside in the provision of kitchen tongs that are strong, durable, high efficient in operation, simple in construction and manufacture and capable of being cheaply produced of corrosion resistant substances such as stainless steel which will improve sanitation in the kitchen by eliminating the necessity of fingers touching foods.

These, together with the various and ancillary objects of the invention which will become apparent as the following description proceeds, are attained by these kitchen tongs, a preferred embodiment of which has been illustrated in the accompanying drawings, by way of example only, wherein:

Figure 1 is a prespective view of the kitchen tongs comprising the present invention;

Figure 2 is a side elevational view of the kitchen utensil shown in Figure 1;

Figure 3 is a top plan view of the kitchen tongs showing more clearly the feature of the inwardly convergent spikes; and, Figure 4 is an enlarged sectional side detail view as taken along the plane of line 4—4 in Figure 3.

It will be seen by reference to the accompanying drawings, wherein like reference numerals designate similar parts throughout the various views, reference numeral 10 is used to generally designate the kitchen tongs comprising the present invention. These kitchen tongs are formed from a pair of tong members 12 and 14, which are bent and crossed at approximately the center part as shown at 16 and pivotally connected relatively to each other by a rivet 18 or other suitable means.

Attached to the handle forming ends of the tong members 12 and 14 which are designated by reference numerals 20 and 22, respectively, there are arcuate finger receiving pieces 24 and 26 which include elongated reinforcing members 28 and 30 welded or otherwise secured to the handle portions 20 and 22, and finger receiving loops 32 and 34 integral with the reinforcing portions 28 and 30. The finger receiving loops 32 and 34 are so arranged as to readily receive the forefinger and thumb of the right hand respectively. The thumb receiving portion 34 is bent forwardly for readily receiving such member.

Secured to the ends of the members 12 and 14 remote from the finger receiving portions are curvilinearly elongated convex holding portions which are held in place on the members 12 and 14 by sleeves 40 and 42. Flanges 44 and 46 are preferably formed integrally with the holding portions 36 and 38 and extend outwardly therefrom.

Offset from the center line of the flanges 44 and 46 and from the center lines of the holding portions 36 and 38 are prongs 48 and 50 and spikes 52 and 54 respectively. The prongs 48 and 50 will meet as shown in Figure 3 when the tongs are in their closed position. The spikes 52 and 54 are inwardly converging and are so arranged that they will not meet. The spikes 52 and 54 are set at their various angles in order to more securely hold the work to be carried, while preventing any slipping on the spikes. The prongs 48 and 50 cooperate with the spikes 52 and 54 to securely grasp the work. Centrally annularly longitudinally extending crimps 56 and 58 are formed in the holding portion for reinforcing the holding portions. Further, when it is desired to lift a glass of hot fluid, it may be done using the present invention by opening the utensil, placing such over the rim of the glass, and then pressing the handle portions together so as to engage the upper edge of the glass. Obviously when it is desired to carry a glass having a lip, such lip will fit within the concave grooves formed by the convex reinforcing crimps 56 and 58.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to falling within the scope of the appended claims.

What is claimed as new is as follows:

1. Tongs comprising two pivoted members, finger pieces secured to an end of each of said members, the ends of said members remote from said finger pieces having secured thereto curvilinear inwardly concave holding portions, flanges at the ends of said holding portions, inwardly extending prongs secured to said flanges, said prongs being offset from the center lines of said flanges, said prongs meeting when said tongs are closed, and convergent inwardly extending spikes secured to said holding portions, said spikes not meeting when said tongs are closed, said spikes being offset from the center lines of said holding portions.

2. Tongs comprising two pivoted members, finger pieces secured to an end of each of said members, the ends of said members remote from said finger pieces having secured thereto curvilinear inwardly concave holding portions, flanges at the ends of said holding portions, inwardly extending prongs secured to said flanges, said prongs being offset from the center lines of said flanges, said prongs meeting when said tongs are closed, spikes secured to said holding portions, said spikes not meeting when said tongs are closed, said spikes being inwardly extending and convergent towards each other to penetrate an article to be grasped at varying cooperative angles, said spikes being offset from the center lines of said holding portions, and convex reinforcing crimps in said holding portions.

References Cited in the file of this patent
UNITED STATES PATENTS

| | | |
|---|---|---|
| 312,642 | Jones | Feb. 24, 1885 |
| 737,333 | Bunt | Aug. 25, 1903 |
| 1,949,452 | Chadwick | Mar. 6, 1934 |